United States Patent [19]

Cucksee et al.

[11] 4,090,893
[45] May 23, 1978

[54] BONDING AGENT SYSTEM FOR IMPROVED PROPELLANT AGING AND LOW TEMPERATURE PHYSICAL PROPERTIES

[75] Inventors: Marjorie T. Cucksee, Huntsville; Henry C. Allen, Decatur, both of Ala.

[73] Assignee: The United States of America as represented by the Secretary of the Army, Washington, D.C.

[21] Appl. No.: 840,927

[22] Filed: Oct. 11, 1977

[51] Int. Cl.$^2$ ............................................. C06B 45/10
[52] U.S. Cl. ..................................... 149/19.9; 149/42; 149/76
[58] Field of Search ....................... 149/19.4, 19.9, 42, 149/76

[56] References Cited

U.S. PATENT DOCUMENTS 3,974,004  8/1976  Cucksee et al. ................ 149/19.9 X Primary Examiner—Stephen J. Lechert, Jr.
Attorney, Agent, or Firm—Nathan Edelberg; Robert P. Gibson; Jack W. Voigt

[57] ABSTRACT

A new combination of bonding agents when employed in hydroxy-terminated polybutadiene propellant compositions yields greatly improved high temperature aging characteristics and greatly improved low temperature physical properties for the compositions. The combination or bonding agent system consists of MT4 (reaction product of 2.0 moles of tris 1(2 methylaziridinyl)phosphine oxide, 0.7 mole adipic acid, and 0.3 mole tartaric acid); HX752 (bis isophthaloyl 1(2 methyl)aziridine); and BIDE (butyliminodiethanol) in a weight percent range of the propellant composition of 0.10% to 0.20%, 0.10% to 0.20% and 0.02% to 0.05% respectively.

2 Claims, 24 Drawing Figures

BONDING AGENT SYSTEM FOR IMPROVED PROPELLANT AGING AND LOW TEMPERATURE PHYSICAL PROPERTIES

DEDICATORY CLAUSE

The invention described herein may be manufactured, used, and licensed by or for the Government for governmental purposes without the payment to us of any royalties thereon.

CROSS-REFERENCE TO RELATED APPLICATION

The bonding agent system of this invention was employed in the hydroxy-terminated polybutadiene composite propellant composition of copending patent application titled: HTPB Pershing Propellant, Ser. No. 805,560, filed June 6, 1977.

BACKGROUND OF THE INVENTION

Most hydroxy-terminated polybutadiene propellants exhibit mild to severe hardening or softening during high temperature aging. It has been determined that the described behavior is attributed to the reaction results of the bonding agent.

Numerous bonding agents have been employed in propellants to improve the binding efficiency and the physical properties. Certain bonding agents have been used to an advantage where it is known that the propellant would be subjected to either an extreme high temperature or low temperature environment. Typically, to determine long term aging behavior of a propellant, accelerated aging programs have been conducted in which the propellant is stored at elevated temperatures and physical properties over a wide temperature range are periodically measured.

Prior art bonding agents including MT4, HX752, and other types have been employed individually in aging studies to determine effects on propellant physical properties. A hydroxy-terminated propellant composition cured with a diisocyanate curing agent and containing MT4 as the bonding agent showed significant softening at high temperature (130° F and 160° F) aging. A propellant containing HX752 and cured with isophorone diisocyanate hardened severely under the same conditions.

Stress-strain curves depict significant changes in physical properties as evidenced by the shape of the curves. For example, propellants employing MT4 have flat or saddle shaped stress-strain curves at −40° F. Propellants employing just HX752 give extremely regressive curves at −40° F. This indicates rapid binder deterioration after reaching a critical stress value and results in poor low temperature properties.

Desirable would be a combination of bonding agents which results in greatly improved high temperature aging characteristics and in improved low temperature physical properties for the hydroxy-terminated polybutadiene propellant composition wherein used.

Therefore, an object of this invention is to provide a combination of bonding agents which greatly improves the high temperature aging characteristics of the hydroxy-terminated polybutadiene propellant compositions wherein used.

Another object of this invention is to provide a combination of bonding agents which results in improved low temperature physical properties of the hydroxy-terminated polybutadiene propellant composition wherein used.

SUMMARY OF THE INVENTION

A combination of bonding agents, in weight percent of the propellant composition, consisting of MT4, (0.10% to 0.20%), HX752 (0.10% to 0.20%) and BIDE (0.02% to 0.05%) yields a HTPB propellant with greatly improved high temperature aging characteristics. The HTPB propellant shows greatly improved physical properties at low temperature as evidenced by the extremely progressive stress-strain curves at −40° F.

The bonding agent system of this invention is employed with propellant compositions which include a hydroxy-terminated polybutadiene binder system with an antioxidant, a diisocyanate curing agent (e.g. dimeryl diisocyanate (DDI), isophorone diisocyanate (IPDI)), a variable amount of a catalyst for controlling the burn rate, a high solids loading of aluminum and ammonium perchlorate, a plasticizer, and an optional delayed quick cure system. The delayed quick cure system with IPDI makes possible a longer pot life but a short cure time of only 2 days as compared to more than 5 days for propellants cured with DDI and 14 days for propellants cured with IPDI without using a catalyzed cure. The delayed quick cure system includes equal parts (0.025 weight percent) of the catalyst triphenylbismuthine (TPB), maleic anhydride, and MgO.

DESCRIPTION OF THE PREFERRED EMBODIMENT

Figure 1:
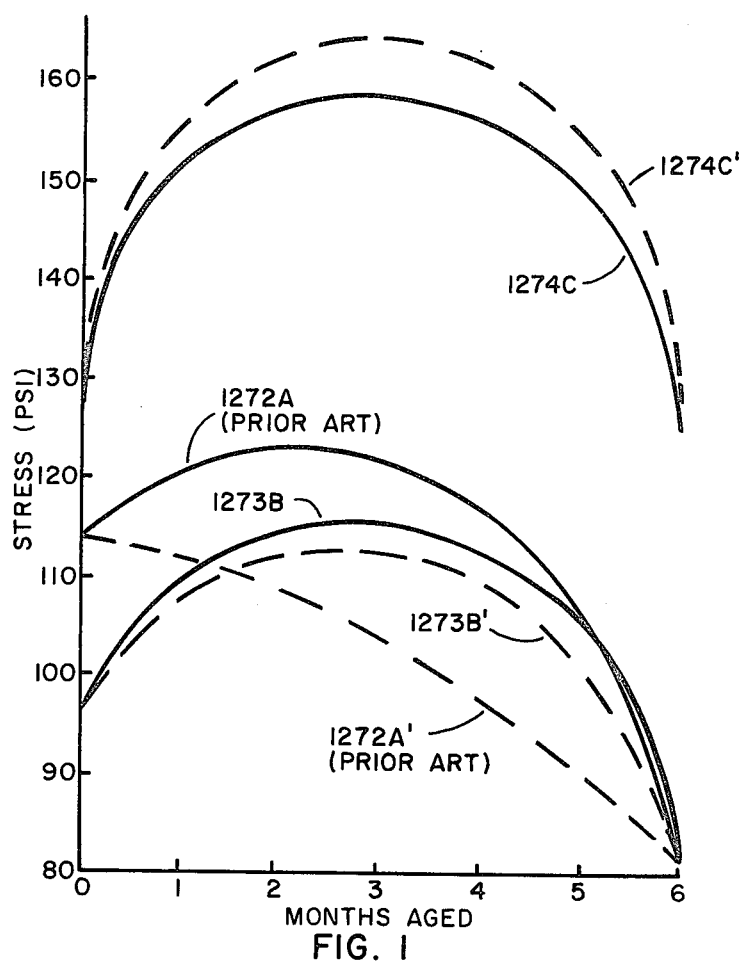
FIGS. 1–9 are graphs which depict physical properties of hydroxy-terminated polybutadiene propellants which have been subjected to accelerated aging programs to test the effectiveness of the bonding agent system of this invention.

A combination of bonding agents consisting of MT4 (reaction product of 2.0 moles of tris 1(2 methylaziridinyl)phosphine oxide, 0.7 mole adipic acid, and 0.3 mole tartaric acid), HX752 (bis isophthaloyl 1(2 methyl)aziridine, and BIDE (butyliminodiethanol) in a weight percent range, based on the propellant composition, of 0.10% to 0.20%, 0.10% to 0.20%, and 0.02% to 0.05% respectively provides unexpected, greatly improved high temperature aging characteristics and unexpected, greatly improved low temperature physical properties for hydroxy-terminated polybutadiene propellant compositions.

The propellant compositions in which the bonding agent system was evaluated included a high solids loading of aluminum metal fuel (0–20%) and ammonium perchlorate (65–88%), hydroxy-terminated polybutadiene binder (7–15%) with antioxidant (0.15 to 1.0% of polymer), diisocyanate curing agent (0.75–3%), plasticizer (0–4%), and burn rate catalyst (0.05–1.5%) and optionally, a delayed quick cure catalyst system (of equal parts) of triphenylbismuthine, MgO, and maleic anhydride (0–0.05% each).

The mechanical properties and aging characteristics are set forth in Tables I–III for HTPB propellant used in evaluating the bonding agent system of this invention.

TABLE I.
MECHANICAL PROPERTIES AND AGING CHARACTERISTICS OF AN 88% SOLID HTPB PROPELLANT AGED AT 130° F

| Sample No. | Bonding Agent | Curing Agent | Months Aged | +140° F* Stress | Strain** | Modulus | 77° F* Stress | Strain** | Modulus | −40° F* Stress | Strain** | Modulus |
|---|---|---|---|---|---|---|---|---|---|---|---|---|
| 1272 | MT$_4$ + H$_2$O | DDI | 0 | 114 | 35.7/36.1 | 513 | 140 | 35.8/37.2 | 637 | 420 | 41.6/48.9 | 3982 |
|  |  |  | 3 | 122 | 36.5/38.0 | 557 | 140 | 35.5/35.5 | 653 | 393 | 42.9/48.1 | 3956 |
|  |  |  | 6 | 81 | 29.6/33.3 | 393 | 101 | 27.8/36.4 | 516 | 385 | 29.0/41.2 | 4283 |
| 1270 | MT$_4$, HX752, BIDE | IPDI | 0 | 103 | 39.9/41.2 | 358 | 135 | 36.9/40.1 | 635 | 489 | 39.0/48.7 | 5676 |
|  |  |  | 3 | 113 | 39.5/40.1 | 512 | 137 | 38.2/40.3 | 646 | 387 | 40.4/51.3 | 3770 |
|  |  |  | 6 | 89 | 35.7/37.4 | 402 | 128 | 36.9/37.8 | 590 | 477 | 39.3/44.6 | 5769 |
| 1273 | MT$_4$, HX752 BIDE | DDI | 0 | 96 | 36.3/36.9 | 408 | 110 | 35.0/36.7 | 516 | 333 | 37.1/46.2 | 4070 |
|  |  |  | 3 | 116 | 32.4/33.0 | 575 | 135 | 34.3/34.8 | 688 | 375 | 42.1/50.0 | 5200 |
|  |  |  | 6 | 81 | 30.2/35.6 | 404 | 118 | 33.9/39.2 | 579 | 430 | 41.0/50.1 | 5230 |
| 1274 | MT$_4$, HX752 BIDE | IPDI with delayed Quick Cure | 0 | 127 | 35.4/35.8 | 605 | 152 | 33.7/35.8 | 742 | 564 | 43.8/47.8 | 7607 |
|  |  |  | 3 | 159 | 31.4/31.6 | 825 | 185 | 34.9/35.6 | 969 | 615 | 37.9/39.9 | 10925 |
|  |  |  | 6 | 125 | 29.9/31.7 | 673 | 174 | 33.7/34.1 | 966 | 613 | 34.2/39.4 | 8560 |

*Test Temperature
**Strain at Maximum Stress/Strain at Break

TABLE II.
MECHANICAL PROPERTIES AND AGING CHARACTERISTICS OF AN 88% SOLID HTPB PROPELLANT AGED AT +160° F

| Sample No. | Bonding Agent | Curing Agent | Months Aged | +140° F* Stress | Strain** | Modulus | 77° F* Stress | Strain** | Modulus | −40° F* Stress | Strain** | Modulus |
|---|---|---|---|---|---|---|---|---|---|---|---|---|
| 1272 | MT$_4$ + H$_2$O | DDI | 0 | 114 | 35.7/36.1 | 513 | 140 | 35.8/37.2 | 637 | 420 | 41.6/48.9 | 3982 |
|  |  |  | 3 | 104 | 31.9/35.8 | 510 | 124 | 33.5/38.2 | 601 | 325 | 35.1/45.6 | 3250 |
|  |  |  | 6 | 82 | 25.7/30.0 | 428 | 96 | 26.9/32.7 | 497 | 391 | 21.8/35.6 | 3955 |
| 1270 | MT$_4$, HX752, BIDE | IPDI | 0 | 103 | 39.9/41.2 | 358 | 135 | 36.9/40.1 | 635 | 489 | 39.0/48.7 | 5676 |
|  |  |  | 3 | 118 | 40.7/42.1 | 521 | 140 | 38.9/39.7 | 651 | 500 | 35.2/43.6 | 7461 |
|  |  |  | 6 | 91 | 35.8/42.4 | 415 | 123 | 38.8/42.3 | 526 | 570 | 29.3/34.3 | 8548 |
| 1273 | MT$_4$, HX752 BIDE | DDI | 0 | 96 | 36.3/36.9 | 408 | 110 | 35.0/36.7 | 516 | 333 | 37.1/46.2 | 4070 |
|  |  |  | 3 | 113 | 32.3/32.5 | 569 | 132 | 35.0/35.4 | 674 | 343 | 42.0/47.6 | 4214 |
|  |  |  | 6 | 81 | 29.8/33.6 | 382 | 109 | 29.2/36.6 | 587 | 429 | 39.5/45.6 | 5536 |
| 1274 | MT$_4$, HX752 BIDE | IPDI delayed Quick Cure | 0 | 127 | 35.4/35.8 | 605 | 152 | 33.7/35.8 | 742 | 564 | 43.8/47.8 | 7607 |
|  |  |  | 3 | 165 | 29.7/29.7 | 916 | 191 | 31.4/31.4 | 1075 | 552 | 38.9/40.5 | 8147 |
|  |  |  | 6 | 128 | 27.8/28.6 | 729 | 166 | 29.4/30.4 | 961 | 594 | 27.3/32.1 | 9289 |

*Test Temperature
**Strain at Maximum Stress/Strain at Break

TABLE III.
MECHANICAL PROPERTIES AND AGING CHARACTERISTICS OF AN 84% SOLID HTPB PROPELLANT AGED AT +170° F

| Sample No. | Bonding Agent | Curing Agent | Months Aged | +140° F* Stress | Strain** | Modulus | 77° F* Stress | Strain** | Modulus | −40° F* Stress | Strain** | Modulus |
|---|---|---|---|---|---|---|---|---|---|---|---|---|
| 1261 | MT$_4$, HX752 BIDE | DDI | 0 | 111 | 43.7/45.6 | 474 | 138 | 54.5/55.4 | 573 | 435 | 77.4/87.5 | 3487 |
|  |  |  | 1 | 80 | 32.4/40.1 | 397 | 118 | 49.8/55.5 | 541 | 386 | 64.1/77.2 | 4268 |
|  |  |  | 2 | 80 | 31.3/37.5 | 408 | 109 | 43.6/52.0 | 543 | 398 | 58.6/73.7 | 4331 |
|  |  |  | 4 | 80 | 24.6/28.3 | 488 | 114 | 35.1/41.4 | 665 | 382 | 43.8/60.4 | 5001 |
|  |  |  | 7 | 75 | 20.0/21.6 | 538 | 92 | 23.4/33.9 | 694 | 377 | 42.3/49.6 | 6399 |
| 1258 | MT$_4$, HX752 BIDE | IPDI DQC | 0 | 126 | 55.5/58.0 | 506 | 159 | 63.3/68.3 | 657 | 551 | 77.0/89.1 | 7394 |
|  |  |  | 1 | 124 | 55.5/58.0 | 495 | 166 | 63.9/68.1 | 709 | 574 | 66.3/77.0 | 7931 |
|  |  |  | 2 | 127 | 55.0/60.4 | 529 | 169 | 63.7/66.7 | 707 | 567 | 67.6/74.1 | 7062 |
|  |  |  | 4 | 120 | 41.9/46.9 | 597 | 186 | 55.4/58.4 | 849 | 548 | 50.7/62.6 | 8779 |
|  |  |  | 7 | 109 | 28.9/34.4 | 645 | 157 | 39.8/44.5 | 922 | 549 | 38.5/43.4 | 9691 |
| 1264 | HX752 | IPDI DQC | 0 | 87 | 30.1/34.0 | 439 | 117 | 38.2/48.3 | 623 | 399 | 14.8/44.7 | 5598 |
|  |  |  | 1 | 106 | 24.3/29.5 | 688 | 140 | 30.4/37.1 | 912 | 454 | 17.4/41.7 | 7216 |
|  |  |  | 2 | 112 | 22.8/25.6 | 765 | 139 | 27.0/31.7 | 975 | 481 | 19.2/38.2 | 7357 |
|  |  |  | 4 | 114 | 18.9/21.6 | 881 | 150 | 24.3/29.4 | 1120 | 508 | 16.7/34.0 | 7891 |
|  |  |  | 7 | 113 | 14.8/16.5 | 1079 | 137 | 16.8/19.9 | 1348 | 520 | 12.5/24.6 | 10094 |

*Test Temperature
**Strain at Maximum Stress/Strain at Break

In further reference to the Figures of the drawing, FIG. 1 is a plotting of stress values of Table I measured at 140° F on propellants 1272, 1273, and 1274 aged at 130° F for 0, 3, and 6 months. Propellant number 1272 which was cured with DDI and which contained MT4 bonding agent and dispersing aid of H$_2$O showed stress values as depicted by curve 1272A. Curve 1273B propellant was cured with DDI and contained the mixed bonding agent system MT4, HX752, and BIDE. Curve 1273B shows that the propellant aged at 130° F remained more stable as compared with prior art propellant depicted by curve 1272A. Curve 1274C depicts stress values for propellant 1274 which is the same as propellant 1273 except propellant 1274 was cured with IPDI and contained delayed quick cure system. (Note: Propellants employing the delayed quick cure system require IPDI instead of DDI for effective results.) Similarly, curves 1272′, 1273B′, and 1274C′ are stress values for propellants 1272, 1273, and 1274 of Table II, but aged at 160° F. Again, the curves and data show that the propellant with mixed bonding agent system has superior aging characteristics.

Figure 2:
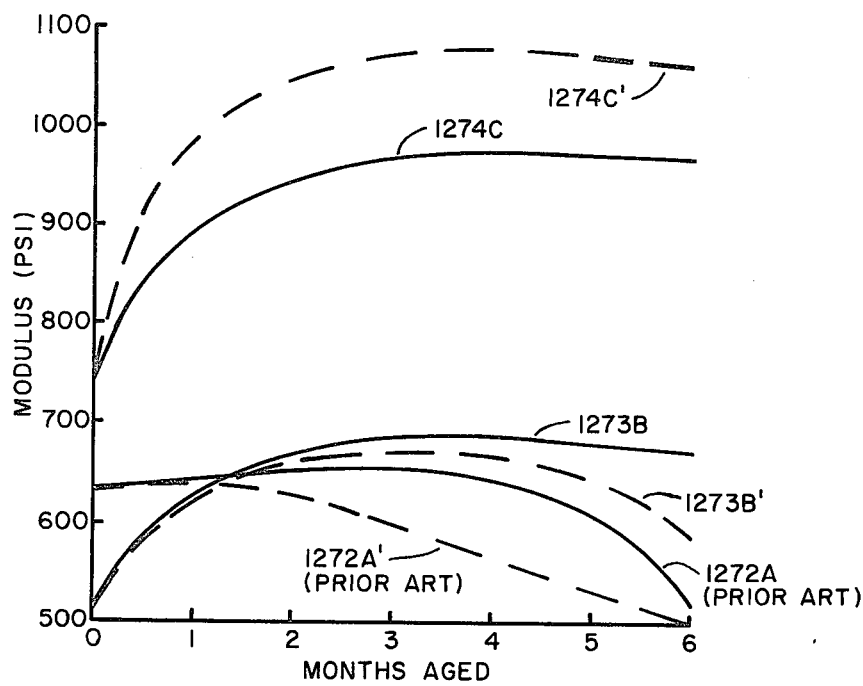

FIG. 2 is a plotting of modulus values measured at 77° F for propellants 1272, 1273, and 1274 of Table I and Table II which were aged at 130° F and 160° F respectively as depicted by curves 1272A, 1273B, 1274C, and 1272A', 1272B', and 1274C' respectively. These curves and data show that the propellant with mixed bonding agent system has superior aging characteristics.

Figure 3:
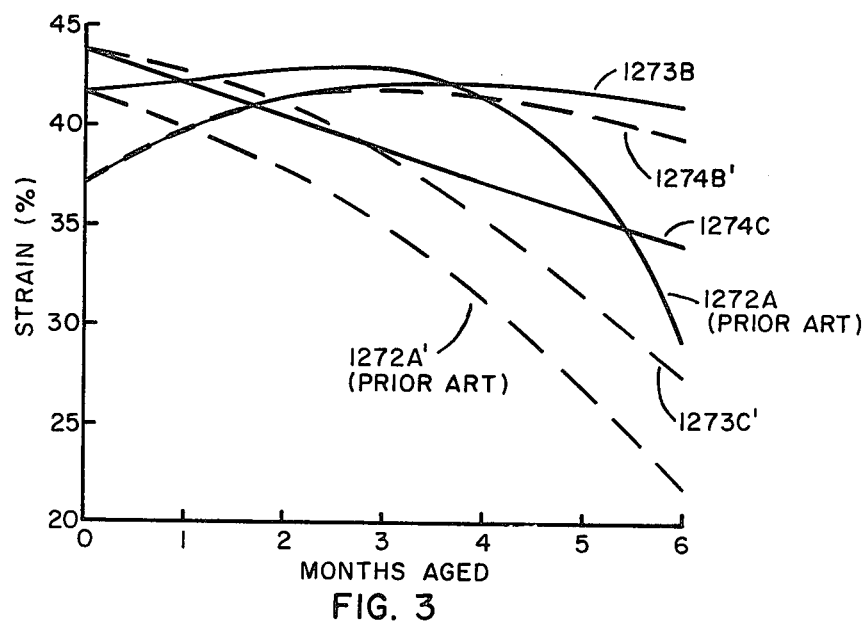

FIG. 3 is a plotting of strain percent values measured at −40° F for propellants 1272, 1273, and 1274 of Table I and Table II which were aged at 130° F and 160° F respectively as depicted by curves 1272A, 1273B, 1274C, and 1272A', 1272B', and 1274C' respectively. These curves and data show that the propellants with mixed bonding agent system has superior aging characteristics.

Figure 4:
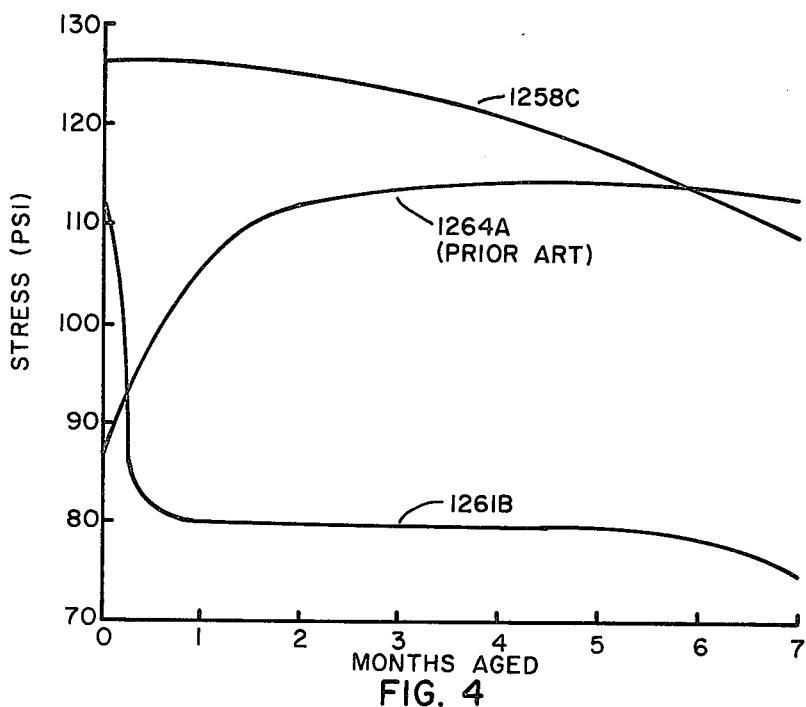

FIG. 4 is a plotting of stress values measured at 140° F for propellants 1264, 1261, and 1258 of Table III which were aged at 170° F. As depicted by curves 1264A, 1261B, and 1258C, the propellants containing the mixed bonding agent system (No. 1261 and No. 1258) are shown not to be inferior to that which contained HX752 alone (No. 1264).

Figure 5:
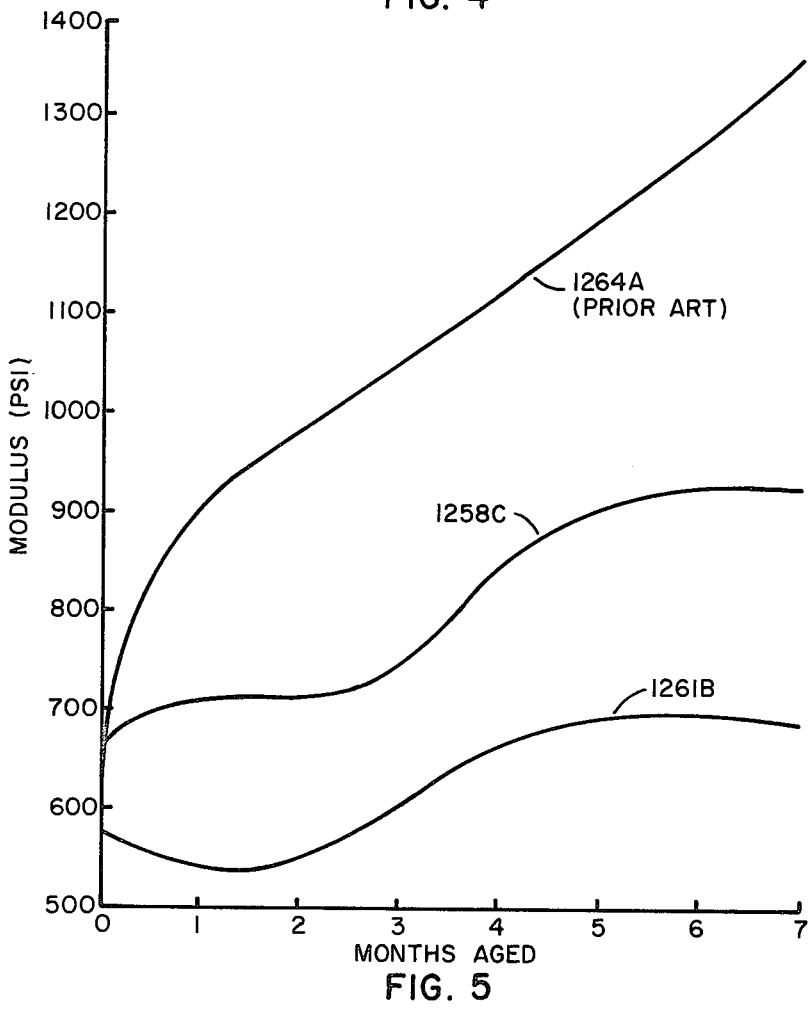

FIG. 5 is a plotting of modulus values measured at 77° F for propellants 1264, 1261, and 1258 of Table III which were aged at 170° F. As depicted by curves 1264A, 1261B, and 1258C, the propellants containing the mixed bonding agent system (No. 1261 and 1258) show superior aging characteristics. Prior art propellant (1264) shows rapid modulus increase which indicates rapid hardening of the binder. Propellants 1261 and 1258 do not show the rapid hardening effect.

Figure 6:
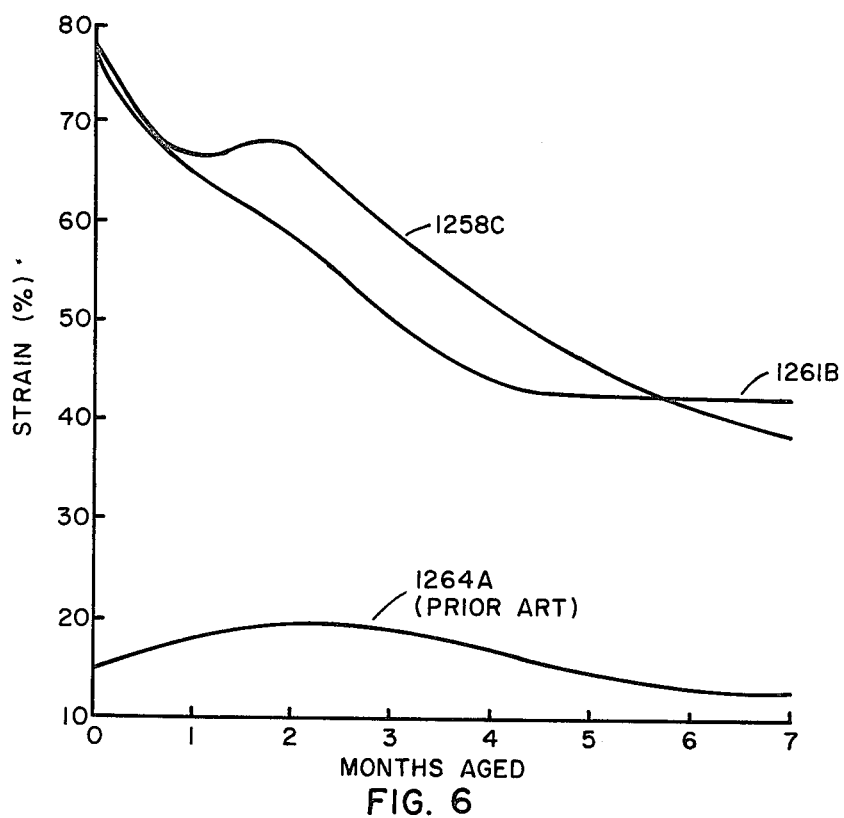

FIG. 6 is a plotting of % strain values measured at −40° F for propellants 1264, 1261, and 1258 of Table III which were aged at 170° F. As depicted by curves 1264A, 1261B, and 1258C, the propellants containing the mixed bonding agent system (No. 1261 and 1258) show superior aging characteristics. Prior art propellant had poor strain at max stress both before and after aging. Propellants 1258 and 1261 showed five times greater strain at max stress at −40° F capability than 1264. After 7 months aging, their strain values were still three times greater than that of 1264.

Figure 7:
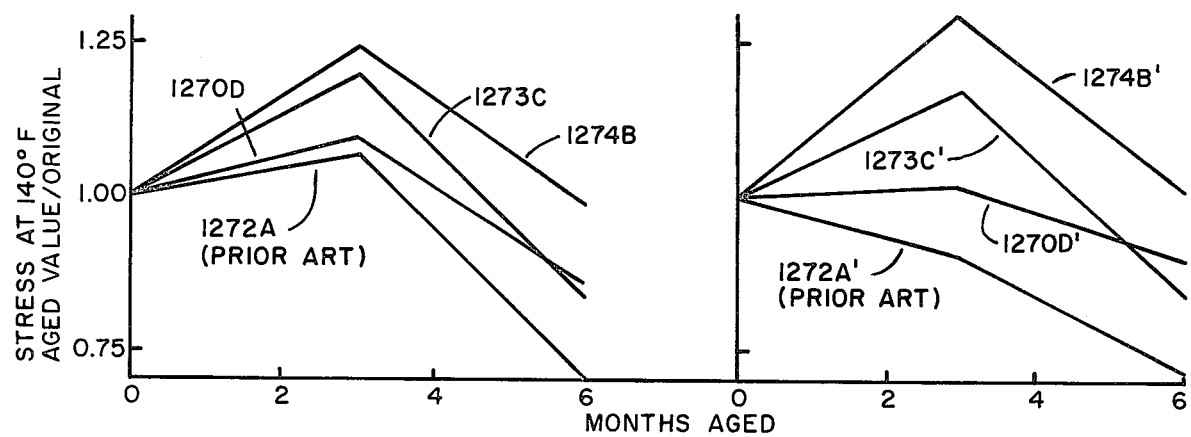

FIG. 7 is a plotting of the ratio of stress values measured at 140° F for propellant samples aged at 130° F to stress values of original or unaged samples. The data for propellant samples 1272, 1274, 1273, and 1270 aged at 130° F and shown in Table I are depicted by curves 1272A, 1274B, 1273C, and 1270D respectively. Similarly, curves 1272A', 1274B', 1273C', and 1270D' are curves depicting ratio of stress values shown in Table II for propellant samples 1272, 1274, 1273, and 1270 respectively aged at 160° F and tested at 140° F. The ratio of stress values as shown by the respective curves show that the aging characteristics are superior for propellants containing the mixed bonding agent.

Figure 8:
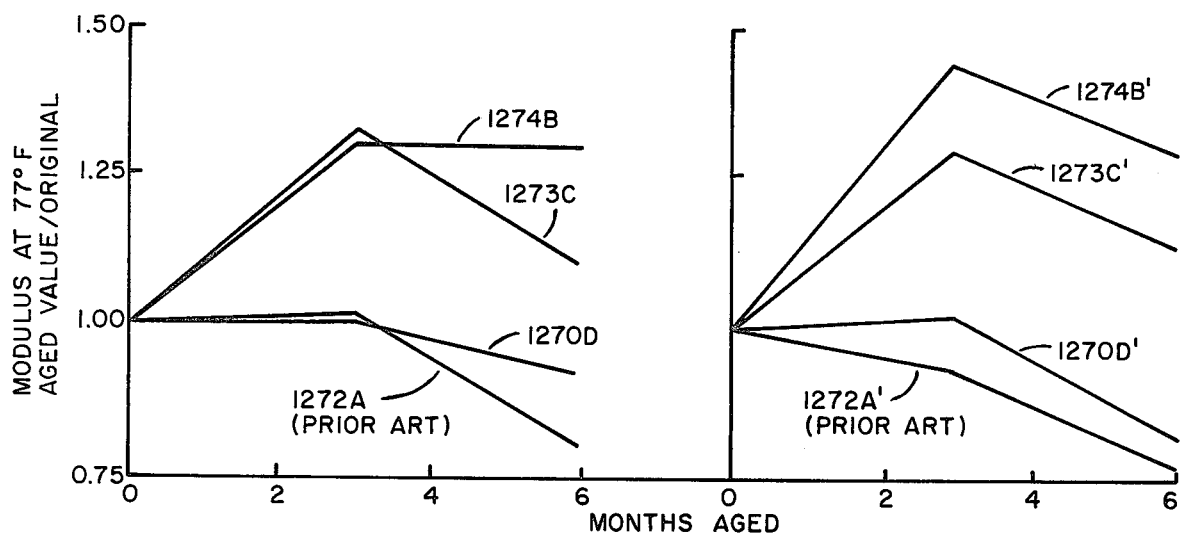

FIG. 8 is a plotting of the ratio of modulus values measured at 77° F for propellant samples aged at 130° F to modulus values of original or unaged samples. The data for propellant samples 1272, 1274, 1273, and 1270 aged at 130° F and shown in Table I are depicted by curves 1272A, 1274B, 1273C, and 1270D respectively. Similarly, curves 1272A', 1274B', 1273C', and 1270D' are curves depicting ratio of modulus values shown in Table II for propellant samples 1272, 1274, 1273, and 1270 respectively aged at 160° F and tested at 140° F. The ratio of modulus values as shown by the respective curves show that the aging characteristics are superior for propellants containing the mixed bonding agent.

Figure 9:
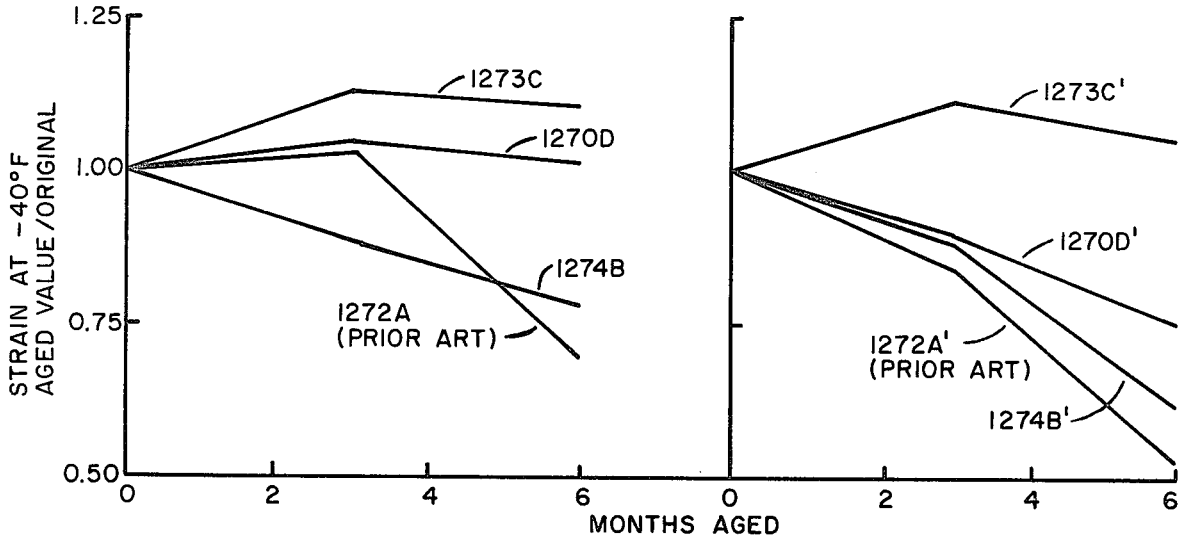

FIG. 9 is a plotting of the ratio of strain % values measured at −40° F for propellant samples aged at 130° F to strain % values of original or unaged samples. The data for propellant samples 1272, 1274, 1273, and 1270 aged at 130° F and shown in Table I are depicted by curves 1272A, 1274B, 1273C, and 1270D respectively. Similarly, curves 1272A', 1274B', 1273C', and 1270D' are curves depicting ratio of strain % values shown in Table II for propellant samples 1272, 1274, 1273, and 1270 respectively aged at 160° F and tested at 140° F. The ratio of strain % values as shown by the respective curves show that the aging characteristics are superior for propellants containing the mixed bonding agent.

Figure 10:
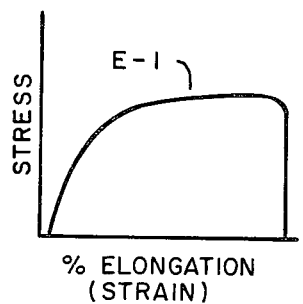
FIGS. 10–24 are stress-strain curves that have been reduced in size to permit comparative viewing of the shapes of the curves resulting from testing a series of hydroxy-terminated polybutadiene propellants which have been subjected to accelerated aging programs.
Figure 11:
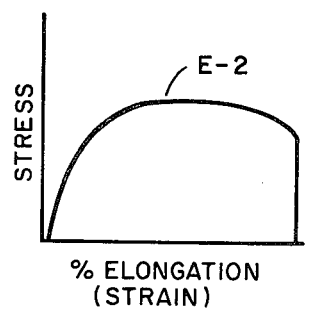
Figure 12:
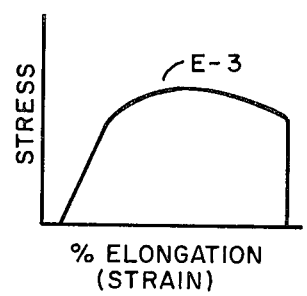

In further reference to FIGS. 10–24 of the drawing, FIGS. 10, 11, and 12 relate to reproduced, reduced-in-size stress-strain curves E-1, E-2, and E-3 for propellant 1272 of Tables I and II, unaged, aged for 6 months at 130° F, and aged for 6 months at 160° F. The shape of the curve E-1 is known in the art as a progressive curve. The change in curve shape to that of the curve E-2 and E-3 (known in the art as "hay stack shape") indicates that degradation has taken place. The degradation can be related to a breakdown of the bonding agent, changes in the binder or clevage of the binder to filler bond, or combinations of any of the degradation mechanisms. The curves E-2 and E-3 indicate that the propellant has undergone significant degradation when aged for 6 months at 130° F and 160° F.

Figure 13:
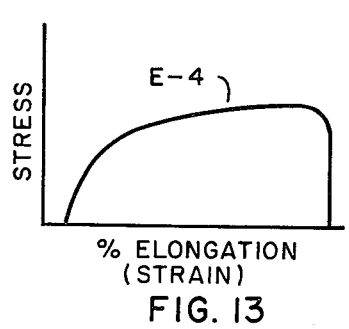
Figure 14:
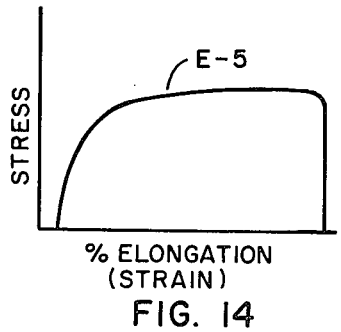
Figure 15:
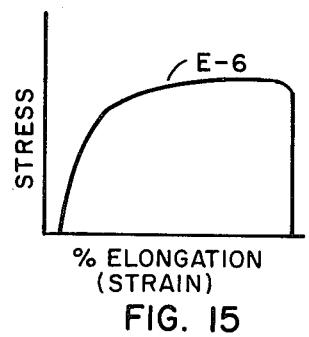

FIGS. 13–15 depict reproduced, reduced-in-size stress-strain curves E-4, E-5, and E-6 respectively for propellant 1273 of Tables I and II, unaged, aged for 6 months at 130° F, and aged for 6 months at 160° F. The mixed bonding agent system resulted in maintaining a stable propellant under high temperature aging as indicated by the retention of the progressive shape of curves E-5 and E-6.

Figure 16:
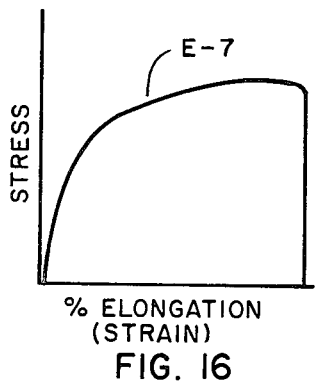
Figure 17:
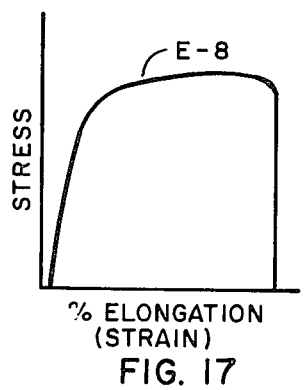
Figure 18:
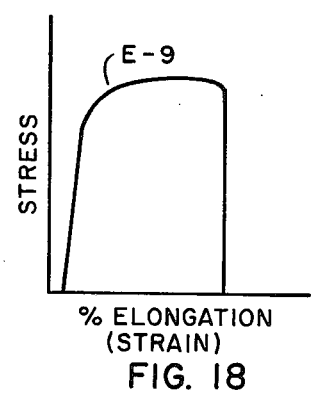

FIGS. 16–18 depict reproduced, reduced-in-size stress-strain curves, E-7, E-8, and E-9 respectively for propellant 1274 of Tables I and II, unaged, aged for 6 months at 130° F, and aged for 6 months at 160° F. The mixed bonding agent system resulted in maintaining a stable propellant under high temperature aging as indicated by the retention of the progressive shape to curves E-8 and E-9.

Figure 19:
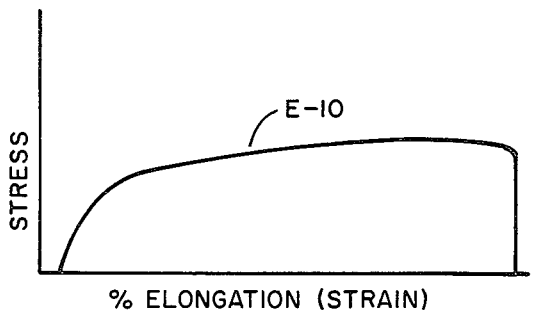
Figure 20:
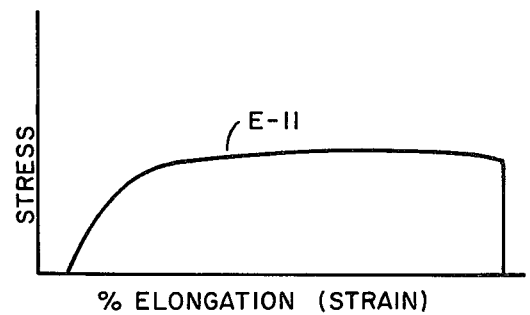

FIGS. 19 and 20 depict reproduced, reduced-in-size stress-strain curves E-10 and E-11 respectively for propellant 1261 of Table III, unaged and aged for 1 month at 170° F. The mixed bonding agent system resulted in maintaining a stable propellant under high temperature aging as indicated by the retention of the progressive shape to curve E-11.

Figure 21:
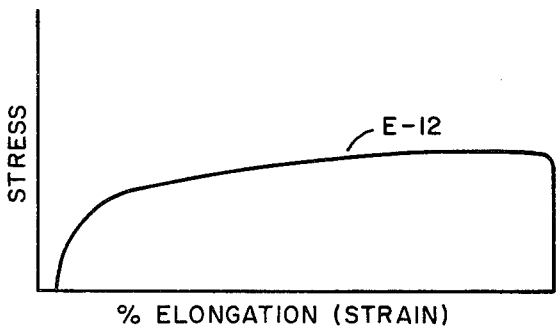
Figure 22:
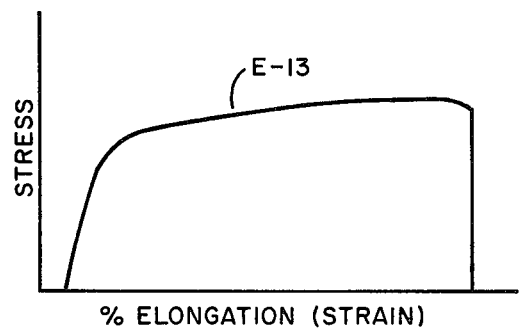

FIGS. 21 and 22 depict reproduced, reduced-in-size stress-strain curves E-12 and E-13 respectively for propellant 1258 of Table III, unaged and aged for 1 month at 170° F. The mixed bonding agent system resulting in maintaining a stable propellant under high temperature aging as indicated by the retention of the substantially progress shape to curve E-13.

Figure 23:
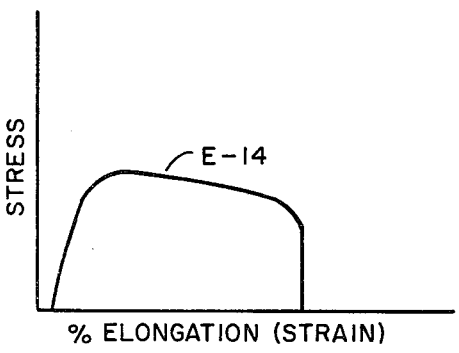
Figure 24:
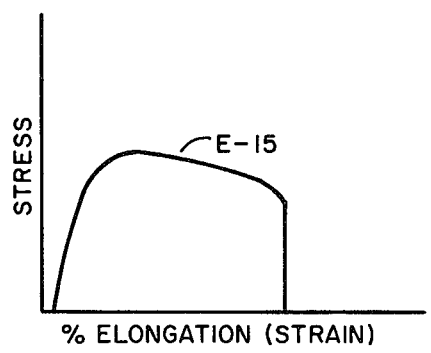

FIGS. 23 and 24 depict reproduced, reduced-in-size stress-strain curves E-14 and E-15 respectively for propellant 1264 of Table III, unaged and aged for 1 month at 170° F. The absence of the mixed bonding agent from this propellant is apparent. Both curves E-14 and E-15 are regressive. This indicates that HX752 alone, used as a bonding agent produces an inferior propellant binder and/or filler to binder bond.

The bonding agent system of this invention was evaluated by testing in two high solids loading propellant formulation as described above. One propellant contained a solids loading of 88% and the other propellant 84%. Both contained typical HTPB binders.

The data set forth in Tables I–III compare initial propellant mechanical properties of propellants with various bonding agents and curing agent systems and their aging characteristics. Tables I–III lists mechanical properties and compare effects to aging characteristics of propellant samples before and after various temperatures of aging (130° F, 160° F and 170° F) when tested at various temperatures of testing of 140° F, 77° F, and −40° F. The HTPB propellants (mixes 1258, 1261, 1270, 1273, and 1274) testing the bonding agent system of this invention employed the combination of MT4, HX752, and BIDE in the amount of 0.15%, 0.15%, and 0.02% respectively. As shown by the data in Tables I–III the bonding agent system yields a propellant with greatly improved high temperature aging characteristics and greatly improved low temperature physical properties. Based on previous knowledge of MT4, HX752, and BIDE these results which show a synergistic effect are unexpected as further noted below. The ratio of bonding agents for MT4 and HX752 in equal amounts from about 0.1% to about 0.2% by weight when used with BIDE in an amount from about 0.02 % to about 0.05% by weight ensures good bonding between the binder and particles of the high solids loading propellant. The range of bonding agent ingredients characteristically produces extremely progressive stress-strain surves curves at −40° F. This is indicative of excellent bonding between solids and binder and results in superior low temperature physical properties.

The combined actions of MT4, HX752, and BIDE as employed in this invention could not have been predicted; therefore, the greatly improved high temperature aging characteristics and greatly improved low temperature physical properties are unexpected results of the combined actions which are evidence of synergism since neither of the bonding agents previously used or tested had shown evidence of yielding a propellant with extremely progressive stress-strain curves at −40° F. The effects to the propellant under high temperature aging conditions indicates that the combined actions of the three bonding agents produces a propellant which neither softens nor hardens severely under the same testing conditions. The softening was present in propellant using only MT4. Severe hardening of the propellant occurred when HX752 and isophorone diisocyanate quick curing was employed.

The blending of the bonding agent system of this invention is accomplished in the same manner as when a single bonding agent is employed. A convenient way to ensure easy blending is to reserve a portion of the polymer to which the calculated amount of bonding agent system is added which is then added to the propellant mixture after all the solid ingredients have been incorporated. After the polymer containing the bonding agent system is added, additional mixing is continued to ensure that adequate contact between the solids, polymer, and bonding agent system is achieved. The curing can be accomplished by conventional curing or a quick cure system can be employed. For either curing technique adequate pot life is ensured for propellant processing.

We claim:

1. A bonding agent system for use in a hydroxy-terminated polybutadiene propellant composition that is curable with a diisocyanate curing agent and that contains a high solids loading of aluminum metal fuel and ammonium perchlorate oxidizer, said bonding agent system consisting of the reaction product of 2.0 moles of tris 1(2 methyl aziridinyl)phosphine oxide, 0.7 mole adipic acid, and 0.3 mole tartaric acid in an amount from about 0.10 to about 0.20 weight percent of said propellant composition; bis isophthaloyl 1(2 methyl)aziridine in an amount from about 0.10 to about 0.20 weight percent of said propellant composition; and butyliminodiethanol in an amount from about 0.02 to about 0.05 weight percent of said propellant composition.

2. The bonding agent system of claim 1 wherein said bonding agent system consists of the reaction product of 2.0 moles of tris 1(2 methyl aziridinyl)phosphine oxide, 0.7 mole adipic acid, and 0.3 mole tartaric acid in an amount of about 0.15 weight percent of said propellant composition; isophthaloyl 1(2 methyl)aziridine in an amount of about 0.15 weight percent of said propellant composition; and butyliminodiethanol in an amount of about 0.02 weight percent of said propellant composition.

* * * * *